United States Patent
Ebiyama

(10) Patent No.: US 9,396,538 B2
(45) Date of Patent: Jul. 19, 2016

(54) IMAGE PROCESSING SYSTEM, IMAGE PROCESSING METHOD, AND PROGRAM

(71) Applicant: NEC Corporation, Minato-ku, Tokyo (JP)

(72) Inventor: Yukie Ebiyama, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/428,692

(22) PCT Filed: Jul. 1, 2013

(86) PCT No.: PCT/JP2013/068016
§ 371 (c)(1),
(2) Date: Mar. 17, 2015

(87) PCT Pub. No.: WO2014/045670
PCT Pub. Date: Mar. 27, 2014

(65) Prior Publication Data
US 2015/0248751 A1    Sep. 3, 2015

(30) Foreign Application Priority Data

Sep. 19, 2012    (JP) .................. 2012-205909

(51) Int. Cl.
*G06K 9/32* (2006.01)
*G06T 7/00* (2006.01)
(Continued)

(52) U.S. Cl.
CPC .............. *G06T 7/003* (2013.01); *G06T 3/0068* (2013.01); *G06T 7/204* (2013.01); *G06T 7/2093* (2013.01);
(Continued)

(58) Field of Classification Search
CPC .. G06K 9/00771; G06K 9/00362; G06T 7/00; G06T 7/003; G06T 7/2093; G06T 7/208; G06T 7/204; G06T 7/2033; G06T 7/2006; G06T 7/2053; G06T 2207/10016; G06T 2207/20081; G06T 2207/20148; G06T 2207/30196; G06T 2207/30232; G06T 2207/30241; H04N 7/18
USPC ......................................... 382/294
See application file for complete search history.

(56) References Cited

U.S. PATENT DOCUMENTS 6,005,493 A * 12/1999 Taniguchi et al. ............ 340/990
6,445,409 B1 * 9/2002 Ito et al. ........................ 348/155
2005/0206726 A1 * 9/2005 Yoshida et al. ............... 348/143
(Continued)

FOREIGN PATENT DOCUMENTS

| JP | 2006-229465 A | 8/2006 |
| JP | 2009-098774 A | 5/2009 |
| JP | 2010-245945 A | 10/2010 |

OTHER PUBLICATIONS

International Search Report for PCT Application No. PCT/JP2013/068016, mailed on Aug. 20, 2013.

*Primary Examiner* — Ali Bayat

(57) ABSTRACT

Provided are an image processing system, an image processing method, and a program capable of restoring, ex post facto, an error in associating a person between cameras. This image processing system includes: an image input unit for receiving an input of pictures captured by a plurality of video cameras; a registration/correction command input unit capable of registering one or more moving objects appearing in the pictures input from the image input unit; and a moving image display unit for displaying, on a display device, the pictures input by the registration/correction command input unit. The registration/correction command input unit is capable of registering that the moving object appearing in the displayed pictures and the moving object registered by the first registration means are the same moving object, and correcting a correspondence relationship of a moving object by associating one moving object, which is in a correspondence relationship registered as the same moving object, with a moving object that is different from the other moving object, which is in the correspondence relationship registered as the same moving object.

8 Claims, 12 Drawing Sheets

(51) Int. Cl.
  *G06T 7/20* (2006.01)
  *G06T 3/00* (2006.01)
  *H04N 7/18* (2006.01)
(52) U.S. Cl.
  CPC ............. *G06T 2207/10016* (2013.01); *G06T 2207/30196* (2013.01); *G06T 2207/30232* (2013.01); *H04N 7/18* (2013.01)

(56) References Cited

U.S. PATENT DOCUMENTS

| | | | |
|---|---|---|---|
| 2009/0009598 A1* | 1/2009 | Sotodate | 348/143 |
| 2009/0059002 A1* | 3/2009 | Kim | 348/143 |
| 2012/0062732 A1* | 3/2012 | Marman et al. | 348/142 |
| 2013/0050502 A1* | 2/2013 | Saito et al. | 348/169 |

* cited by examiner

IMAGE PROCESSING SYSTEM, IMAGE PROCESSING METHOD, AND PROGRAM

This application is a National Stage Entry of PCT/JP2013/068016 filed on Jul. 1, 2013, which claims priority from Japanese Patent Application 2012-205909 filed on Sep. 19, 2012, the contents of all of which are incorporated herein by reference, in their entirety.

BACKGROUND

Modes according to the present invention relate to an image processing system, an image processing method, and a program.

In recent years, considered is a system of monitoring a wide range using pictures from a plurality of cameras. For example, Patent Publication JP-A-2010-245945 discloses a device for appropriately tracking (monitoring) a person spanning across multiple cameras by using coupling relation information between the cameras. This device obtains the correspondence relationship of the person according to the similarity of the person's characteristic feature value at the point (In point) that the person appears in the camera view, and the point (Out point) that the person disappears from the camera view.

Upon automatically setting the correspondence relationship of the person according to the similarity as with the device described in Patent Publication JP-A-2010-245945, an error will arise with a fixed probability. Thus, there are demands for performing the association of a person in a manner of involving a human. Nevertheless, even when a human performs the association, for instance, there is a possibility that the association will end in an error in cases where there are a plurality of persons with similar appearances, or in cases where an operational error occurs.

SUMMARY

The several modes of the present invention were devised in view of the foregoing problems, and one object of this invention is to provide an image processing system, an image processing method, and a program capable of restoring, ex post facto, an error in the association of a person between cameras.

The image processing system according to the present invention includes: input means for receiving an input of pictures captured by a plurality of video cameras; first registration means capable of registering one or more moving objects appearing in the pictures input from the input means; first display control means for displaying, on a display device, the pictures input by the input means; second registration means capable of registering that the moving object appearing in the displayed pictures and the moving object registered by the first registration means are the same moving object; and correction means capable of correcting a correspondence relationship of a moving object by associating one moving object, which is in a correspondence relationship registered as the same moving object by the second registration means, with a moving object that is different from the other moving object, which is in the correspondence relationship registered as the same moving object by the second registration means.

The image processing method according to the present invention is performed by an image processing system, and includes the steps of: receiving an input of pictures captured by a plurality of video cameras; enabling registration of one or more moving objects appearing in the input picture; displaying the input pictures on a display device; enabling registration to the effect that the moving object appearing in the displayed pictures and the registered moving object are the same moving object; and enabling correction of a correspondence relationship of a moving object by associating one moving object, which is in a correspondence relationship registered as the same moving object, with a moving object that is different from the other moving object, which is in the correspondence relationship registered as the same moving object.

The program according to the present invention causes a computer to execute: processing of receiving an input of pictures captured by a plurality of video cameras; processing of enabling registration of one or more moving objects appearing in the input picture; processing of displaying the input pictures on a display device; processing of enabling registration to the effect that the moving object appearing in the displayed pictures and the registered moving object are the same moving object; and processing of enabling correction of a correspondence relationship of a moving object by associating one moving object, which is in a correspondence relationship registered as the same moving object, with a moving object that is different from the other moving object, which in the correspondence relationship registered as the same moving object.

Note that, in the present invention, terms such as "unit" or "means", "apparatus", "system" do not simply refer to physical means, and also include cases of realizing, via software, the functions of such "unit" or "means", "apparatus", "system". Moreover, the functions of one "unit" or "means", "apparatus", "system" may be realized by two or more physical means or devices, or the functions of two or more "units" or "means", "apparatuses", "systems" may be realized by one physical means or device.

According to the present invention, it is possible to provide an image processing system, an image processing method, and a program capable of restoring, ex post facto, an error in the association of a person between cameras.

EXEMPLARY EMBODIMENTS

Figure 1:
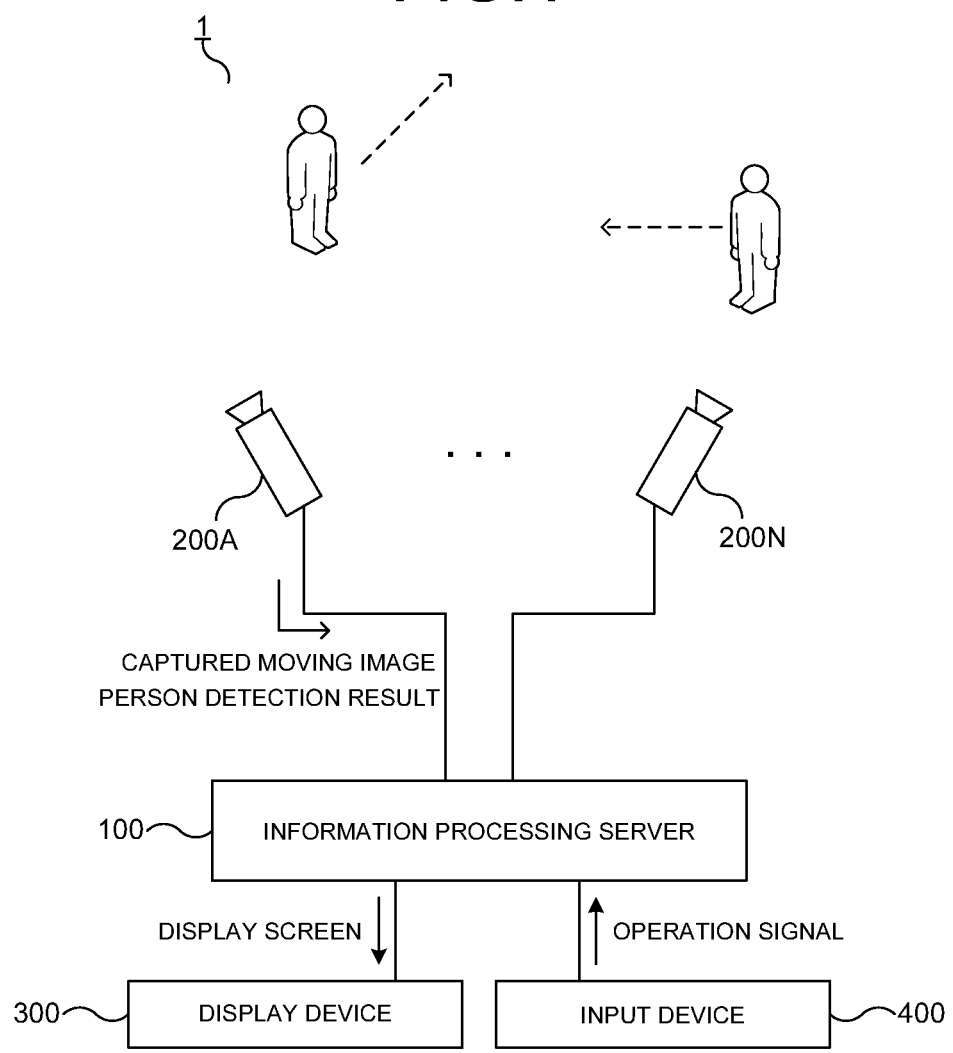
FIG. 1 is a functional block diagram showing a schematic configuration of the monitoring system according to the first embodiment.

Embodiments of the present invention are now explained. The same or similar configuration in the descriptions of the ensuing explanation and reference drawings is given the same or similar reference numeral.

1 First Embodiment

FIG. 1 to FIG. 11 are diagrams explaining the first embodiment. This embodiment is now explained in accordance with the following flow with reference to FIG. 1 to FIG. 11. Foremost, the system configuration is described in Section "1.1", and the outline of operation is described in Section "1.2" by illustrating specific examples of the display screen. Subsequently, the functional configuration of system is described in Section "1.3", the flow of processing is described in Section "1.4", and specific examples of the hardware configuration capable of implementing this system are indicated in Section "1.5". Finally, the effect of this embodiment is explained in Section "1.6" onward.

(1.1 System Configuration)

The system configuration of the monitoring system 1 as the image processing system according to this embodiment is now explained with reference to FIG. 1. FIG. 1 is a block diagram showing the system configuration of the monitoring system 1.

The monitoring system 1 is basically configured from an information processing server 100, a plurality of video cameras 200 for capturing (imaging) pictures (moving images) (video cameras 200A to 200N are hereinafter collectively referred to as the "video cameras 200"), a display device 300, and an input device 400.

While the monitoring system 1 is explained as a system for monitoring a person captured by the video cameras 200 in the ensuing explanation, the object to be monitored is not limited thereto. For example, the object to be monitored may also be applied to various moving objects such as a vehicle, a bicycle, or a motorcycle.

The video cameras 200 capture pictures (moving images), and, upon determining whether a person is included in the captured pictures, sends information such as the position and characteristic feature value of that person, together with the captured moving images, to the information processing server 100. Moreover, the video cameras 200 can also track the person in the pictures by comparing the captured pictures between frames.

Note that the detection of a person and extraction of the characteristic feature value, and processing performed within the camera such as the tracking of a person do not need to be performed by the video cameras 200, and may also be performed, for example, by the information processing server 100 or by another information processing apparatus not shown.

The information processing server 100 performs various types of processing such as the registration of the person to be tracked and the tracking of the registered person by analyzing the pictures captured by the video cameras 200.

Note that the pictures processed by the information processing server 100 are not limited to the real-time pictures captured by the video cameras 200, and considered may be cases where, after being captured by the video cameras 200, the pictures stored in a storage device (for instance, hard disk drive (HDD), video cassette recorder (VCR) or the like) are tracked (analyzed). In particular, in order to enable the correction of the registration relation of the correspondence relationship of the foregoing person, it is necessary to record the captured pictures, and enable the tracking processing to be performed once again based on the recorded pictures.

In addition, considered may be cases where the moving images stored in the storage device are tracked by being reproduced in reverse (reverse playback). Normally, when a certain person exhibits suspicious behavior, since it is necessary to check what path that person took and what kind of actions were taken by that person up to the suspicious behavior, it is extremely important to enable tracking based on the foregoing reverse playback.

Figure 2:
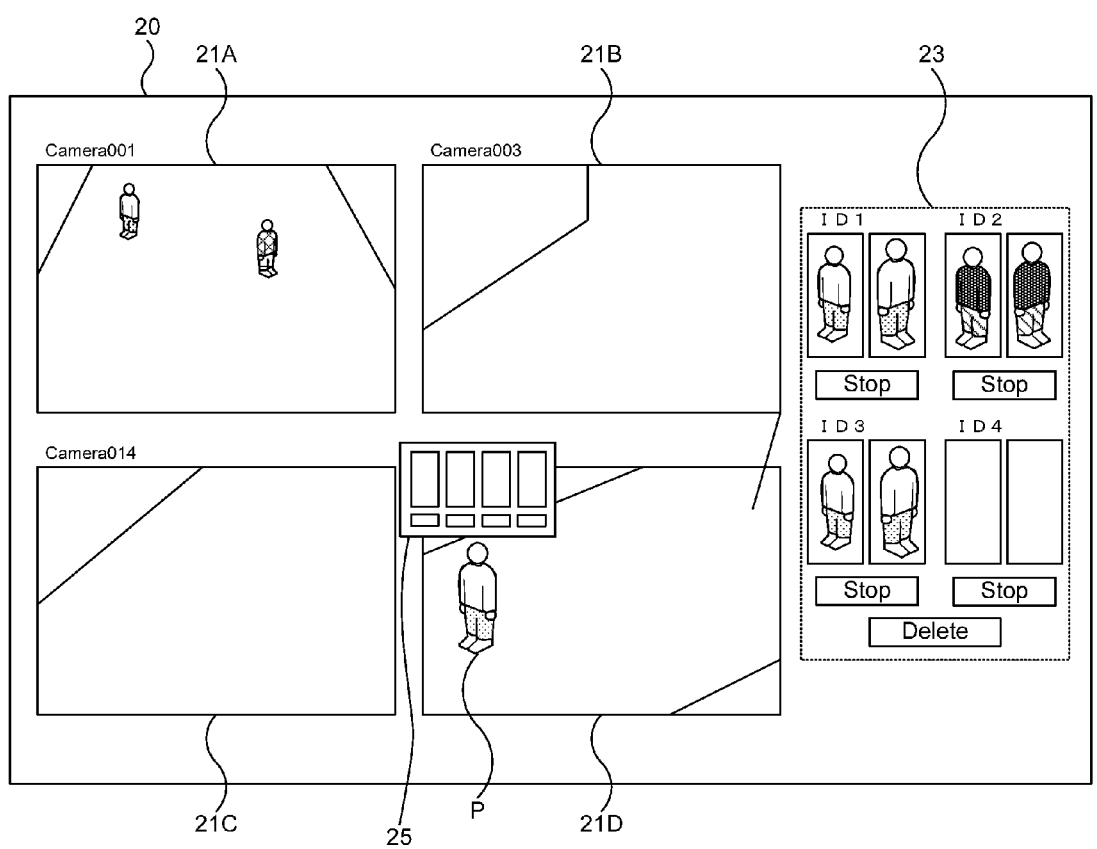
FIG. 2 is a diagram showing a specific example of the display screen.

During the monitoring of a person with the information processing server 100, the information processing server 100 outputs various display screens such as the monitoring screen to the display device 300, and receives, from the input device 400, operation signals of the various operation inputs pertaining to the monitoring of that person. More specifically, for example, with the monitoring screen (a specific example is illustrated in FIG. 2 described later) displayed on the display device 300, by displaying a plurality of pictures input from the video cameras 200, the user as the observer can understand the current location of the person to be monitored.

When the user as the observer views the display device 300 and a person to be monitored who appeared in the picture (moving image) of a certain video camera 200 appears in the picture of another video camera 200, the user operates the input device 400 and associates those two persons as being the same person. Moreover, in this embodiment, as described later, if the association was erroneous, the user can operate the input device 400 and correct that association.

The display device 300 is a display for displaying images, for instance, on a liquid crystal or an organic electro luminescence (EL). The monitoring screen output from the information processing server 100 is displayed on the display device 300.

The input device 400 is a device that is used by the user (observer) for inputting various types of information. For instance, a mouse or a touch pad, a pointing device such as a touch panel, a keyboard and the like correspond to the input device 400. Various types of processing such as the registration of the person to be monitored, association that the registered person and the person who appeared in the video cameras 200 are the same person, and correction of such association are performed based on the user's operations made to the input device 400.

Note that various configurations of the information processing server 100, and the display device 300 and the input device 400 may be considered. For example, the display device 300 and the input device 400 may be realized as a single client, or the functions of the information processing server 100, the display device 300, and the input device 400 may be realized with three or more information processing apparatuses. Moreover, when the display device 300 and the input device 400 are realized as a single client, certain functions of the information processing server 100 according to this embodiment may be given to the client.

(1.2 Explanation of Operation)

(1.2.1 Registration of Correspondence Relationship)

Figure 3:
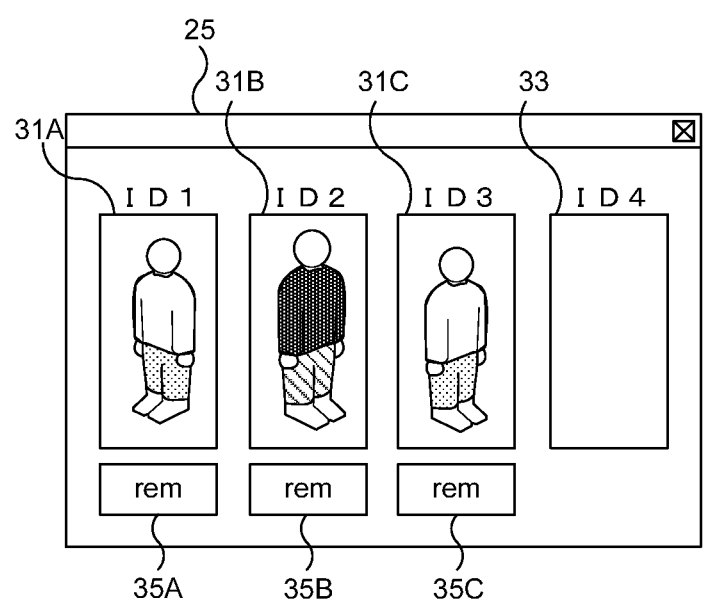
FIG. 3 is a diagram showing a specific example of the pop-up window to be displayed on the display screen.

Specific examples of the display screen to be displayed, on the display device 300, for human monitoring are now explained with reference to FIG. 2 and FIG. 3. FIG. 2 is a diagram showing a specific example of the display screen (hereinafter also referred to as the "monitoring screen 20") to be displayed on the display device 300 for human monitoring.

The example of the monitoring screen 20 illustrated in FIG. 2 includes picture areas 21A to 21D (hereinafter also collectively referred to as the "picture areas 21") for displaying the captured pictures input from a plurality of video cameras 200, and a person-to-be-monitored display area 23 displaying the person(s) to be monitored.

The picture areas 21 display multi-camera pictures input from a plurality of video cameras 200 as described above. Here, the pictures of the video cameras 200 displayed on the respective picture areas 21 may be switched as needed. For example, after the person to be monitored disappears from the display area, control for switching to the picture of the video camera 200, in which that person is expected to appear next, may be performed pursuant to the movement of that person.

The person-to-be-monitored display area 23 is an area where the user as the observer registers, among the persons appearing in the picture areas 21, the person or persons who are chosen to be monitored. As shown in the example of FIG. 2, a plurality of persons to be monitored may be selected (three persons in the example of FIG. 2). Moreover, a plurality of human images (two human images in the example of FIG. 2) of different postures; for instance, front view and rear view, of the respective persons are displayed in the person-to-be-monitored display area 23.

In addition, in the example of the monitoring screen 20 illustrated in FIG. 2, a pop-up window 25 is displayed above the person P appearing in the picture area 21D. The pop-up window 25 is used for determining whether the person P should be monitored, and whether the person P is the same person as the person who has been registered in the person-to-be-monitored display area 23.

The pop-up window 25 is displayed near a newly detected person P. The position of the pop-up window 25 moves pursuant to the movement (motion) of the person P. As a result of disposing the pop-up window 25 near the target person P as described above, it is possible to yield effects such as facilitating the identification of the person P to be newly registered by the user, facilitating the comparison of the person P and a registered person to be monitored, and narrowing the operation range.

A specific example of the pop-up window 25 is now explained with reference to FIG. 3. FIG. 3 is a diagram showing a specific example of the pop-up window 25. In the example of FIG. 3, human images 31A to 31C (hereinafter collectively referred to as the "human images 31") as thumbnails of the persons to be monitored respectively assigned with ID1, ID2, and ID3, and a blank image 33 assigned with ID4 are arranged side by side.

When the user selects a human image 31, the information processing server 100 associates the person to be monitored corresponding to that human image 31 and the person P appearing in the picture as being the same person. Moreover, when the user selects the blank image 33, the information processing server 100 registers the person P appearing in the picture as a new person to be monitored having an ID4.

In addition, registration buttons 35A to 35C (indicated as "rem" in the diagram to represent "remove"; hereinafter also collectively referred to as the "registration buttons 35") for the user to register that it is not the same person provided below the human images 31 are used by the user for registering that the previously registered persons to be monitored corresponding to ID1, ID2 and ID3 are not the same person as the person P appearing in the picture.

Moreover, here, the respective persons disposed in the pop-up window 25 may be arranged in ascending order from the person who is most likely to coincide with the person P, or only N-number of persons likely to coincide with person P may be arranged. The possibility of coinciding with the person P may be calculated based on the estimation of association described later. As a result of adopting this kind of method, the user can easily select the person who corresponds (or does not correspond) to the person P.

(1.2.2 Correction of Correspondence Relationship)

While the user performs the registration of the person to be monitored and the association of the person to be monitored based on the operation described in Section "1.2.1", there is a possibility that the association of the person will end in an error in cases where there is a person with a similar appearance as the person to be monitored, or in cases where an operational error occurs. Thus, the monitoring system 1 according to this embodiment provides a user interface (UI) which allows the correction of the registered association.

Figure 4:
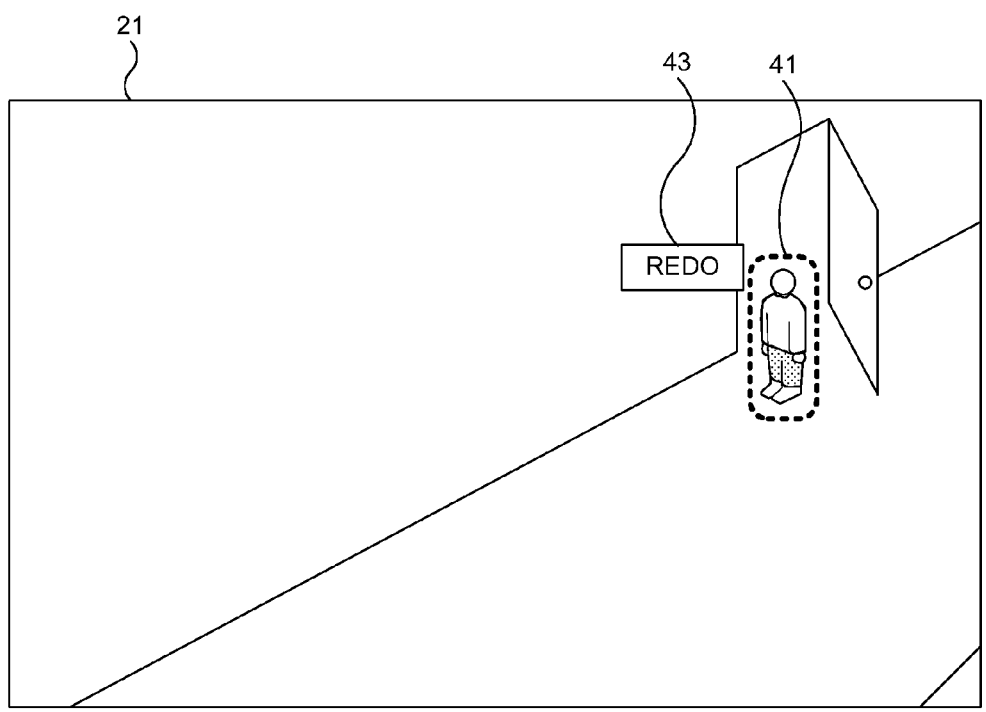
FIG. 4 is a diagram showing a specific example of the user interface to be displayed on the display screen.
Figure 5:
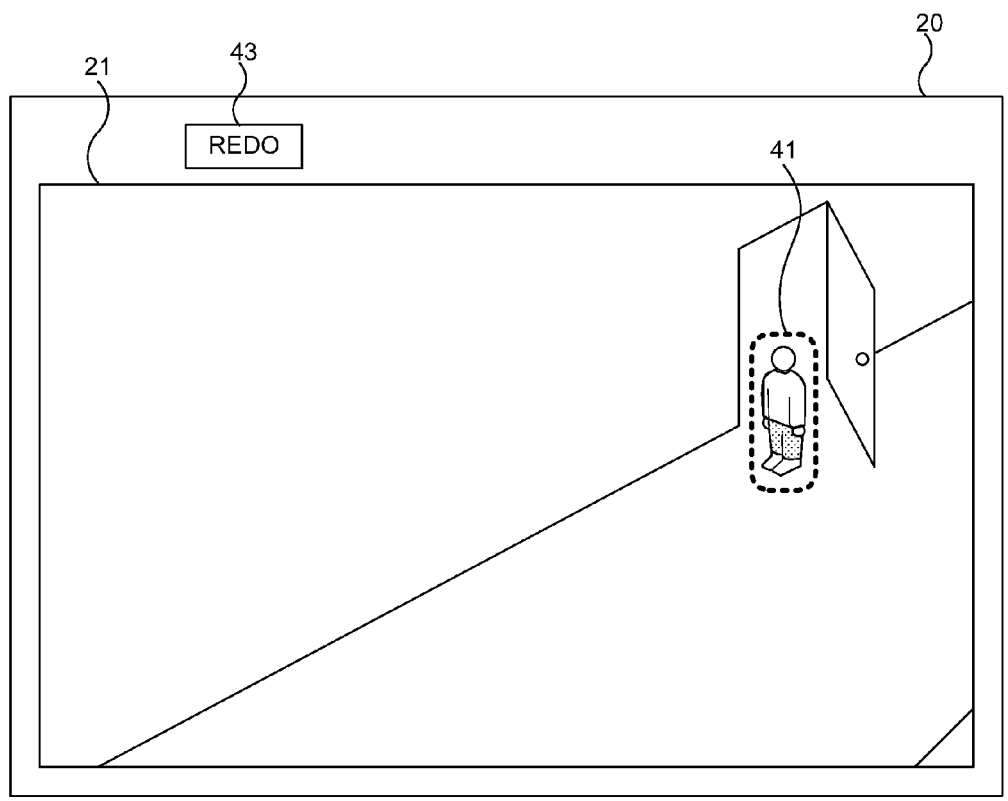
FIG. 5 is a diagram showing a specific example of the user interface to be displayed on the display screen.

FIG. 4 and FIG. 5 are diagrams showing an example of the user interface for the user to register the correction. Note that the picture area 21 of FIG. 4 and FIG. 5 corresponds to the picture area 21 of the monitoring screen 20 explained with reference to FIG. 2. Note that the interface of FIG. 4 and FIG. 5 is used for providing two pieces of information to the user; namely, information indicating that correction is required, and designation of the moving object that is being subject to erroneous tracking processing.

The example of FIG. 4 is foremost explained. The example of FIG. 4 shows a state where, after the image 41 for recognizing the person to be monitored is selected by the user, a correction registration button 43 for correcting the association of that person is displayed on the display screen.

The example of FIG. 5 shows a case where the order is reversed. In other words, FIG. 5 shows a specific example of a display screen where, after the correction registration button 43 constantly displayed above the monitoring screen 20 is selected by the user, the user selects the person to be monitored for which the association is to be corrected.

Figure 6:
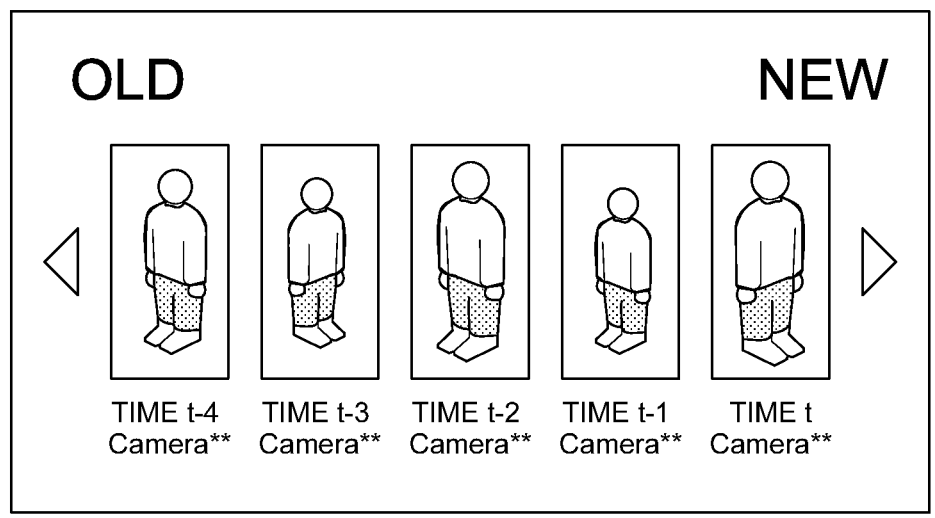
FIG. 6 is a diagram showing a specific example of the user interface to be displayed on the display screen.
Figure 7:
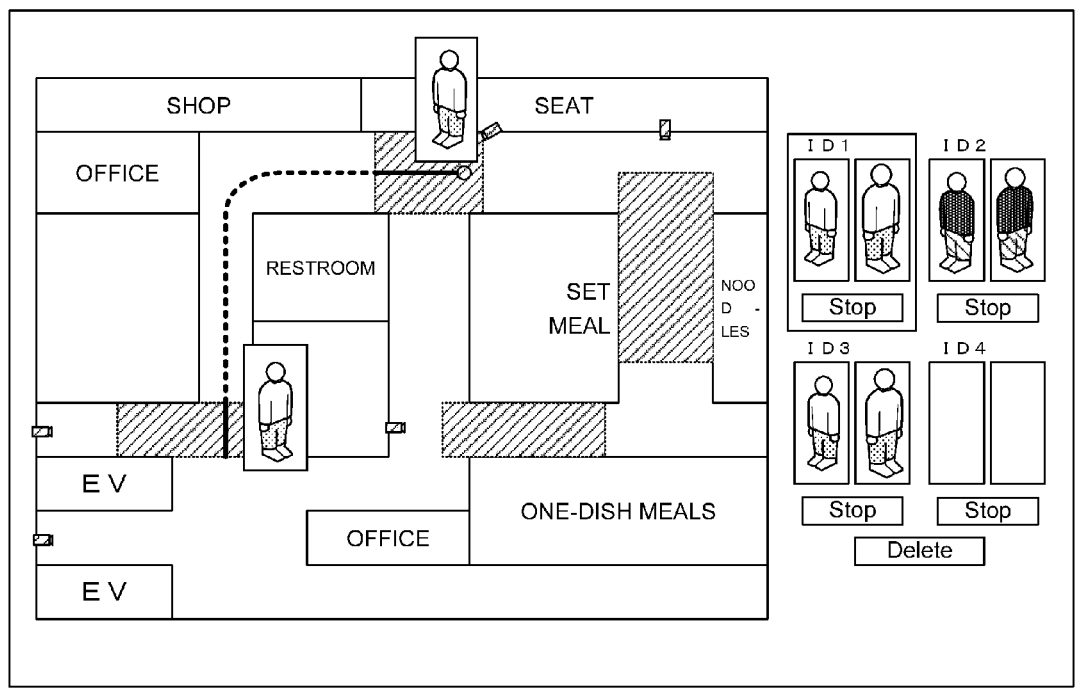
FIG. 7 is a diagram showing a specific example of the display screen.

When the user commands a correction on the screen shown in FIG. 4 or FIG. 5, the information processing server 100 displays a screen for causing the user to select from where the association of that person should be corrected on the display device 300. FIG. 6 and FIG. 7 are diagrams showing specific examples of the input screen for the user to input from how far retroactively the association should be corrected (for the user to input the correction time).

The example of FIG. 6 shows a state where a plurality of human images of the person associated with the person P designated by the user as the target of correction are displayed in order in a time series. In this example, five images are retroactively arranged from the current time, and the captured time and information regarding the used camera are shown below the respective images.

The example of FIG. 7 shows the moving path that is estimated based on the current correspondence relationship information and the captured image of the person P designated by the user as the target of correction. Note that, in the example of FIG. 7, the moving path obtained as a result of tracking the movement in the camera is indicated with a solid line, and the moving path between the cameras which is estimated based on the user's association of that person is indicated with a broken line. The shaded area in the diagram shows the shooting range of the video cameras 200.

As shown in FIG. 7, by presenting to the user the estimated moving path in addition to the past human image, the user can identify the location where the association was misjudged upon also giving consideration to the possibility of the moving path.

Figure 8:
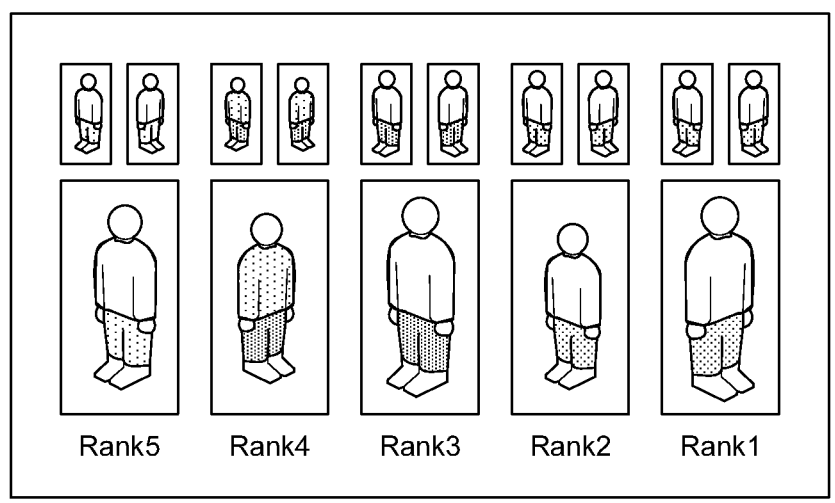
FIG. 8 is a diagram showing a specific example of the user interface to be displayed on the display screen.

FIG. 8 shows images for registering the person to which the proper association after correction is performed. In the example of FIG. 8, a plurality of (five in the example of FIG. 8) images of persons who can be associated are arranged in ascending order from the person who is most likely to coincide with the person P. Moreover, a plurality of human images (three in the example of FIG. 8; for instance, three images among left, right, front and back may be selected) from different shooting directions of the respective persons are arranged.

In addition, images of the respective persons walking may also be displayed. This is because, when the manner of walking of the person to be monitored is unique, it is easier to compare whether they are the same person using a moving image.

(1.3 Functional Configuration of System)

Figure 9:
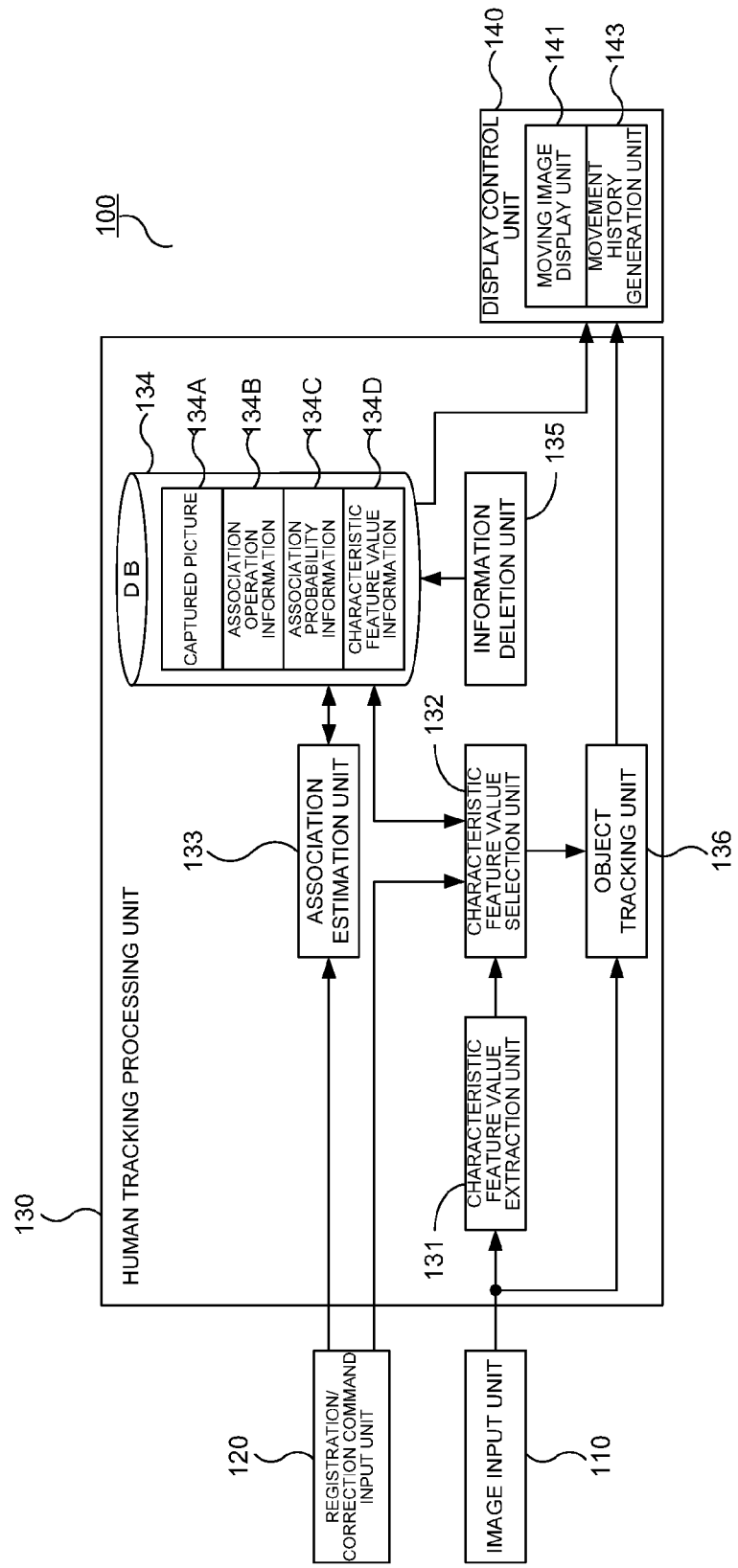
FIG. 9 is a functional block diagram showing a schematic configuration of the information processing server illustrated in FIG. 1.

The functional configuration of the information processing server 100 according to this embodiment is now explained with reference to FIG. 9. FIG. 9 is a functional block diagram showing the functional configuration of the information processing server 100 according to this embodiment.

As shown in FIG. 9, the information processing server 100 generally includes an image input unit 110, a registration/correction command input unit 120, a human tracking processing unit 130, and a display control unit 140.

The image input unit 110 successively receives the input of pictures captured by the video cameras 200 and the results of human detection. Here, the human detection result to be input includes information of the movement locus (times series data of the person's location and characteristic feature value information) tracked within the same view angle (within the same picture) for each person extracted as an object by comparing the characteristic feature values of the persons who were detected within the picture and the images (frames) in a time series.

The registration/correction command input unit 120 receives, based on the operation signals received from the input device 400 in accordance with the operations input by the user from the input device 400, various inputs such as the registration command of the person to be monitored, the association command of the person to be monitored, and the correction command of the association. During the correction, for instance, as described above, information of the person (moving object) at the point in time that the tracking was misjudged and information of the correct person to be tracked are input from the registration/correction command input unit 120.

The display control unit 140 provides to the user as the observer the user interface illustrated in FIG. 2 to FIG. 8 by displaying the various display screens on the display device 300 based on the results of the human tracking processing performed by the human tracking processing unit 130. The display control unit 140 includes a moving image display unit 141, and a movement history generation unit 143. The moving image display unit 141 reproduces the picture input from the image input unit 110 or the captured picture 134A recorded in the DB 134 and displays, for example, pictures in the picture areas 21 shown with the specific example in FIG. 2. The movement history generation unit 143 generates a movement history area included in the display screen of FIG. 7 based on the tracking result of the person analyzed by the moving object tracking unit 136.

The human tracking processing unit 130 performs the human tracking processing based on the picture and the human detection result input from the image input unit 110, and the user's command input from the registration/correction command input unit 120. The human tracking processing unit 130 includes, as shown in FIG. 9, a characteristic feature value extraction unit 131, a characteristic feature value selection unit 132, an association estimation unit 133, a database (DB) 134, an information deletion unit 135, and a moving object tracking unit 136.

The characteristic feature value extraction unit 131 extracts information related to the characteristic feature value of a person from the picture and the human detection result input from the image input unit 110.

The characteristic feature value selection unit 132 stores the characteristic feature value extracted by the characteristic feature value extraction unit 131 as the characteristic feature value information 134D in the DB 134 as needed. Moreover, in accordance with the operation input from the registration/correction command input unit 120, the characteristic feature value selection unit 132 reads, from the DB 134, information of a person who is likely to correspond to the characteristic feature value input from the characteristic feature value extraction unit 131, and outputs the read information to the moving object tracking unit 136.

The association estimation unit 133 registers information related to the operation input from the registration/correction command input unit 120, and registers the operation of that association as the association operation information 134B in the DB 134. Moreover, the association estimation unit 133 estimates the human correspondence relationship (combination of association) based on information such as the characteristic feature value in the DB 134. The estimation of correspondence relationship can be performed based on the information of association input by the user, or based on the similarity of the characteristic feature values of the persons appearing in the pictures captured by the respective video cameras 200, or the comparative result of the elapsed time required for moving between the two video cameras, and the average time normally required for moving between the two video cameras.

For example, when the similarity of the person who framed-out after appearing in the video camera 200A at time t and the person who newly appeared in the video camera 200N at time t+1 is high, it is considered that the possibility that both persons correspond (are the same person) is high. Moreover, if the difference between the time that is normally required for moving from the shooting range of the video camera 200A to the shooting range of the video camera 200N (may be provided in advance or calculated statistically from the average value), and the time that was actually required for the movement (difference of time t+1 and time t) is small, it is considered that the possibility of both persons corresponding is high. The association estimation unit 133 evaluates the possibility of association for each person and evaluates whether a correspondence relationship achieved by combining the foregoing associations can be established, and thereby calculates the probability of the respective associations and registers the result as the association probability information 134C in the DB 134.

Moreover, when the association estimation unit 133 receives a person-related correction command from the registration/correction command input unit 120, the association estimation unit 133 re-calculates the association probability information 134C based on that command. Based on the foregoing probability, the display of the pop-up window 25 explained with reference to FIG. 3, and the order of display of the human images to be associated with the target person will change on the display screen explained with reference to the FIG. 8.

Note that, when there is any inconsistency in the association (including the corrected association) input by the user, the association estimation unit 133 notifies the user to such effect by displaying a message on the display control unit 140 or via voice notification. Note that, when there is any inconsistency in the association, for example, in a case where the person A appears in the camera 1 at time t, the person B appears in the camera 2 at time t, and the person C appears in the camera 3 at time t+1, respectively, considered may be a case where the user associated both the person A and the person B with the person C.

The information deletion unit 135 deletes, among the various types of information registered in the DB 134, information which is deemed unnecessary as needed. As the condition for deleting information, for instance, considered may be the characteristic feature value information 134D in which a given period of time has elapsed since the extraction thereof, and the association probability information 134C or the association operation information 134B in which a given period of time has elapsed without being corrected. Otherwise, when the user issues a command for correcting the correspondence relationship, the association operation information 134B and the association probability information 134C before the correction of the correspondence relationship will be deleted by the information deletion unit 135.

The moving object tracking unit 136 performs human tracking to the pictures input from the image input unit 110 based on the characteristic feature value output from the characteristic feature value selection unit 132. When the user issues a command for correcting the association, the moving object tracking unit 136 performs the human tracking processing from the correction time to the current time once again based on the corrected correspondence relationship.

(1.4 Flow of Processing)

Figure 10:
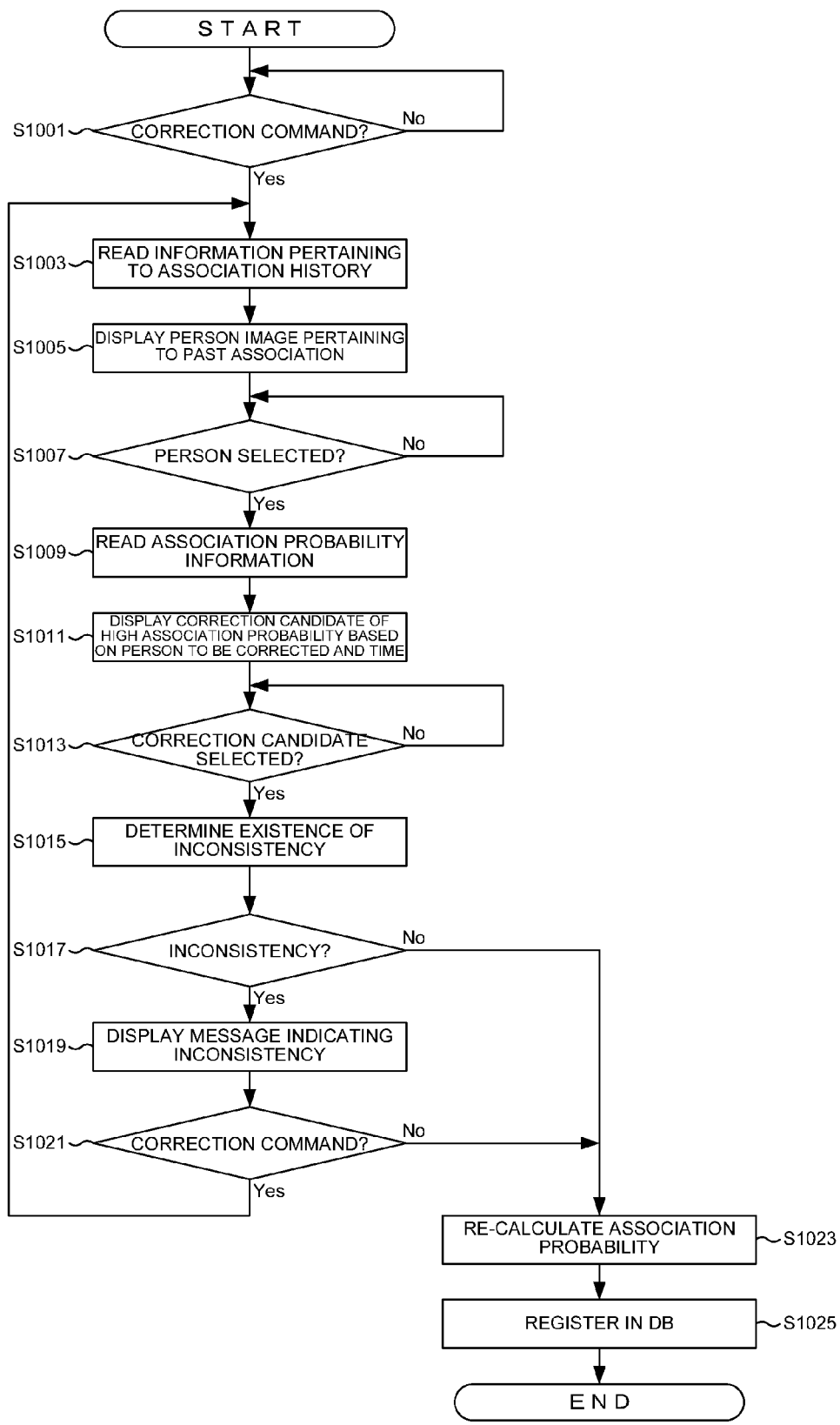
FIG. 10 is a flowchart showing the flow of processing of the information processing server illustrated in FIG. 1.

The flow of processing to be performed by the information processing server 100 upon correcting the association is now explained with reference to FIG. 10. FIG. 10 is a flowchart showing the flow of processing of the information processing server 100 according to this embodiment.

Note that each of the processing steps described later can be executed by arbitrarily changing the order or in parallel to the extent that no inconsistency will arise in the processing contents. Moreover, another step may be added between the respective processing steps. In addition, a step that is indicated as one step for the sake of convenience may be executed by being separated into a plurality of steps, and a step that is indicated by being separated into a plurality of steps for the sake of convenience may be executed as a single step.

Foremost, the registration/correction command input unit 120 determines whether a correction command was input by the user via the input device 400 (S1001). For example, this corresponds to the user selecting both images 41 and 43 in the display screen of FIG. 4 or FIG. 5.

Based on the correction command, the display control unit 140 reads data from the DB 134, reads the association operation information 134B as the history of past associations (S1003), and causes the display device 300 to display the respective human images who have been associated to date (S1005). Specific examples of this interface have been explained with reference to FIG. 6 and FIG. 7.

When the user selects a human image for retroactively correcting the association on the screen illustrated in FIG. 6 or FIG. 7 (corresponds to the selection of the correction time as the time of correcting the association) (S1007; Yes), the display control unit 140 reads the association probability information 134C from the DB 134, and, based on a display screen similar to the one illustrated in FIG. 8, causes the display device 300 to display the correction candidates with high association probability in relation to the person to be corrected and the time.

When the correction candidate is selected by the user (S1013; Yes), the association estimation unit 133 refers to the association operation information 134B and confirms whether there is any inconsistency in the association (S1015). If there is any inconsistency (S1017; Yes), the display control unit 140 displays a message on the display device 300 (alerts the user) to the effect that the association needs to be corrected (S1019). When a correction command is consequently input by the user (S1021; Yes), the processing of S1003 onward is performed to the person causing such inconsistency.

When no inconsistency is discovered in S1017 (S1017; No), or when a correction command is not input in S1021 (S1021; No), the association estimation unit 133 recalculates the association probability based on the corrected correspondence relationship (S1023), and registers the result as the association probability information 134C in the DB 134 (S1025). Here, the monitoring of the current time can be quickly resumed by displaying pictures from the correction time to the current time in the picture areas 21 upon increasing the speed of playback.

(1.5 Hardware Configuration)

An example of the hardware configuration for realizing the foregoing information processing server 100 with a computer is now explained with reference to FIG. 11. Note that, as described above, the functions of the information processing server 100 can be realized using a plurality of information processing apparatuses.

Figure 11:
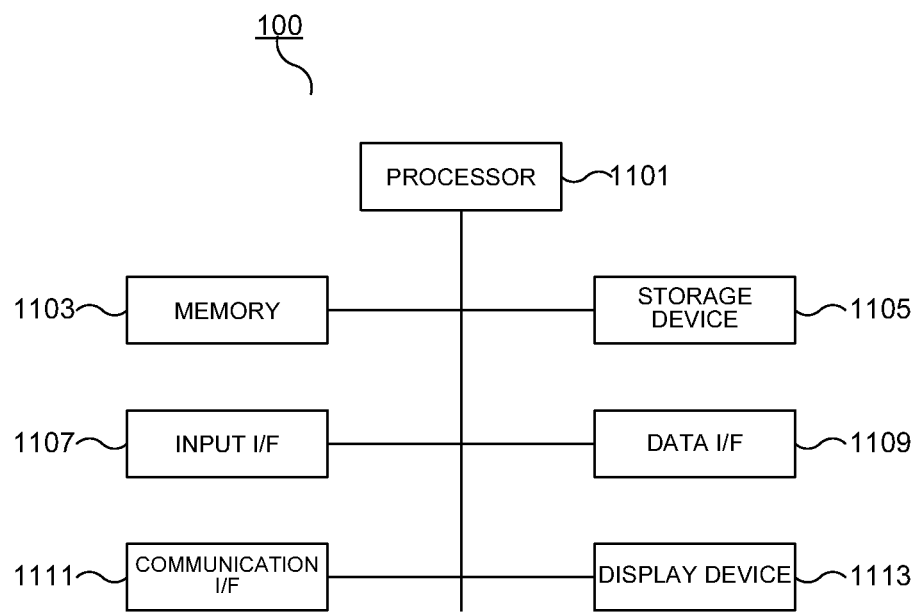
FIG. 11 is a block diagram showing the hardware configuration capable of implementing the information processing server illustrated in FIG. 1.

As shown in FIG. 11, the information processing server 100 includes a processor 1101, a memory 1103, a storage device 1105, an input interface (I/F) 1107, a data I/F 1109, a communication I/F 1111, and a display device 1113.

The processor 1101 controls the various types of processing in the information processing server 100 by executing the programs stored in the memory 1103. For example, the processing pertaining to the registration/correction command input unit 120, the image input unit 110, the characteristic feature value extraction unit 131, the characteristic feature value selection unit 132, the association estimation unit 133, the information deletion unit 135, the moving object tracking unit 136, and the display control unit 140 explained in FIG. 9 can be realized as programs that mainly run on the processor 1101 upon temporarily being stored in the memory 1103.

The memory 1103 is a storage medium such as a random access memory (RAM). The memory 1103 temporarily stores program codes of the programs to be executed by the processor 1101, and data that is required upon executing the programs. For example, a stack area that is required upon executing the programs is reserved in the storage area of the memory 1103.

The storage device 1105 includes, for instance, a nonvolatile storage medium such as a hard disk or a flash memory. The storage device 1105 stores, for instance, an operating system, various programs for realizing the registration/correction command input unit 120, the image input unit 110, the characteristic feature value extraction unit 131, the characteristic feature value selection unit 132, the association estimation unit 133, the information deletion unit 135, the moving object tracking unit 136, and the display control unit 140, and various types of data included in the DB 134 such as the captured picture 134A, the association operation information 134B, the association probability information 134C, and the characteristic feature value information 134D. The programs and data stored in the storage device 1105 are referred to by the processor 1101 by being loaded into the memory 1103 as needed.

The input I/F 1107 is a device for receiving inputs from the user. The input device 400 explained with reference to FIG. 1 can also be realized by the input I/F 1107. As a specific example of the input I/F 1107, a keyboard or a mouse, a touch panel, and various sensors may be used. The input I/F 1107 may also be connected to the information processing server 100 via an interface such as a universal serial bus (USB).

The data I/F 1109 is a device for inputting data from the outside of the information processing server 100. As a specific example of the data I/F 1109, there is a drive device for reading data stored in various storage mediums. The data I/F 1109 may also be provided outside the information processing server 100. In the foregoing case, the data I/F 1109 is connected to the information processing server 100 via an interface such as a USB.

The communication I/F 1111 is a device for performing data communication, via wire or wireless, with an external device of the information processing server 100 such as the video camera 200. The communication I/F 1111 may also be provided outside the information processing server 100. In the foregoing case, the communication I/F 1111 is connected to the information processing server 100 via an interface such as a USB.

The display device 1113 is a device for displaying various types of information. The display device 310 explained with reference to FIG. 1 can also be realized with the display device 1113. As a specific example of the display device 1113, for instance, a liquid crystal display or an organic electro-luminescence (EL) display may be used. The display device 1113 may also be connected to the outside of the information processing server 100. In the foregoing case, the display device 1113 is connected to the information processing server 100 via a display cable or the like.

(1.6 Effect of this Embodiment)

As explained above, with the monitoring system 1 according to this embodiment, the association of the person to be monitored can be performed by receiving, from the user, the input of information or the like to the effect that the person to be monitored is the same person. In addition, when the user recognizes that the association is erroneous, the user can correct the association of that person retroactively and, therefore, the association can be corrected ex post facto.

2 Second Embodiment

Figure 12:
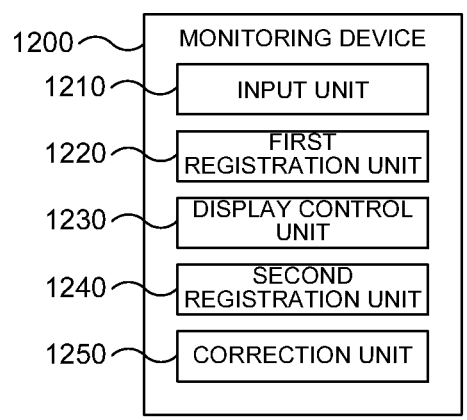
FIG. 12 is a functional block diagram showing a schematic configuration of the monitoring device according to the second embodiment.

The second embodiment is now explained with reference to FIG. 12. FIG. 12 is a block diagram showing the functional configuration of a monitoring device 1200 as an image processing system. As shown in FIG. 12, the monitoring device 1200 includes an input unit 1210, a first registration unit 1220, a display control unit 1230, a second registration unit 1240, and a correction unit 1250.

The input unit 1210 receives the input of pictures captured by a plurality of video cameras not shown. The first registration unit 1220 can register one or more moving objects appearing in the pictures input from the input unit 1210. This registration is performed, for example, based on the user's command.

The display control unit 1230 display, on a display device not shown, the pictures input by the input unit 1210. The second registration unit 1240 can register the moving object appearing in the pictures displayed by the display control unit 1230 and the moving object registered by the first registration unit 1220 as the same moving object. This registration is performed, for example, based on the user's command.

The correction unit 1250 can correct the correspondence relationship of the moving object by associating one moving object of the correspondence relationship that was registered as the same moving object by the second registration unit 1240 and a moving object that is different from the other moving object of the correspondence relationship that was registered as the same moving object by the second registration unit 1240.

As a result of adopting the foregoing configuration, according to the monitoring device 1200 according to this embodiment, it is possible to restore, ex post facto, an error in the association of a person between cameras.

3 Appendix

Note that the configuration of the foregoing embodiments may be combined or a partial configuration may be substituted. Moreover, the configuration of the present invention is not limited to the foregoing embodiments, and may be variously modified to the extent that the modification does not deviate from the gist of the present invention.

Note that a part or all of the respective embodiments described above may be as described in the following Supplementary notes, but are not limited thereto. Moreover, the program of the present invention will suffice so as long as it is a program capable of causing a computer to execute the respective operations explained in each of the foregoing embodiments.

(Supplementary Note 1)

An image processing system comprising: input means for receiving an input of pictures captured by a plurality of video cameras; first registration means capable of registering one or more moving objects appearing in the pictures input from the input means; first display control means for displaying, on a display device, the pictures input by the input means; second registration means capable of registering that the moving object appearing in the displayed pictures and the moving object registered by the first registration means are the same moving object; and correction means capable of correcting a correspondence relationship of a moving object by associating one moving object, which is in a correspondence relationship registered as the same moving object by the second registration means, with a moving object that is different from the other moving object, which is in the correspondence relationship registered as the same moving object by the second registration means.

(Supplementary Note 2)

The image processing system according to Supplementary note 1 above, further comprising computing means for calculating a characteristic feature value of the moving object appearing in the pictures input by the input means, wherein the second registration means is capable of registering that the moving object appearing in the displayed pictures and the moving object registered by the first registration means are the same moving object according to the characteristic feature value calculated by the computing means.

(Supplementary Note 3)

The image processing system according to Supplementary note 2 above, further comprising storage means for storing the characteristic feature value, and deletion means for deleting the characteristic feature value stored in the storage means, subject to a condition.

(Supplementary Note 4)

The image processing system according to any one of Supplementary notes 1 to 3 above, further comprising second display control means for displaying, on a display device, a movement history of the moving object registered by the first registration means according to the correspondence of the moving object registered by the second registration means and the correspondence of the moving object corrected by the correction means.

(Supplementary Note 5)

The image processing system according to any one of Supplementary notes 1 to 4 above, wherein the correction means can correct the correspondence relationship of a moving object by displaying, on a display device, the moving object to be corrected in a time series.

(Supplementary Note 6)

The image processing system according to any one of Supplementary notes 1 to 4 above, wherein the correction means can correct the correspondence relationship of the moving object by displaying, on a display device, a movement history of the moving object to be corrected.

(Supplementary Note 7)

The image processing system according to any one of Supplementary notes 1 to 6 above, further comprising informing means for informing that, when a correspondence relationship is corrected by the correction means, an inconsistency will occur in the corrected correspondence relationship.

(Supplementary Note 8)

An image processing method to be performed by an image processing system, the method comprising the steps of: receiving an input of pictures captured by a plurality of video cameras; enabling registration of one or more moving objects appearing in the input picture; displaying the input pictures on a display device; enabling registration to the effect that the moving object appearing in the displayed pictures and the registered moving object are the same moving object; and enabling correction of a correspondence relationship of a moving object by associating one moving object, which is in a correspondence relationship registered as the same moving object, with a moving object that is different from the other moving object, which is in the correspondence relationship registered as the same moving object.

(Supplementary Note 9)

The image processing method according to Supplementary note 8 above, further comprising a step of calculating a characteristic feature value of the moving object appearing in the input picture, wherein the moving object appearing in the displayed pictures and the registered moving object can be registered as being the same moving object according to the characteristic feature value obtained based on the foregoing calculation.

(Supplementary Note 10)

The image processing method according to Supplementary note 9 above, further comprising the steps of storing the characteristic feature value, and deleting the stored characteristic feature value subject to a condition.

(Supplementary Note 11)

The image processing method according to Supplementary note 9 or Supplementary note 10 above, further comprising a step of displaying, on a display device, a movement history of the registered moving object according to the correspondence relationship of the registered moving object and the correspondence relationship of the corrected moving object.

(Supplementary Note 12)

The image processing method according to any one of Supplementary notes 8 to 11 above, wherein the correspondence relationship of a moving object can be corrected by displaying, on a display device, the moving object to be corrected in a time series.

(Supplementary Note 13)

The image processing method according to any one of Supplementary notes 8 to 11 above, wherein the correspondence relationship of a moving object can be corrected by displaying, on a display device, the movement history of the moving object to be corrected.

(Supplementary Note 14)

The image processing method according to any one of Supplementary notes 8 to 13 above, further comprising a step of informing that, when a correspondence relationship is corrected, an inconsistency will occur in the corrected correspondence relationship.

(Supplementary Note 15)

A program for causing a computer to execute: processing of receiving an input of pictures captured by a plurality of video cameras; processing of enabling registration of one or more moving objects appearing in the input picture; processing of displaying the input pictures on a display device; processing of enabling registration to the effect that the moving object appearing in the displayed pictures and the registered moving object are the same moving object; and processing of enabling correction of a correspondence relationship of a moving object by associating one moving object, which is in a correspondence relationship registered as the same moving object, with a moving object that is different from the other moving object, which in the correspondence relationship registered as the same moving object.

(Supplementary Note 16)

The program according to Supplementary note 15 above, further comprising processing of calculating a characteristic feature value of the moving object appearing in the input picture, wherein the moving object appearing in the displayed pictures and the registered moving object can be registered as being the same moving object according to the characteristic feature value obtained based on the foregoing calculation.

(Supplementary Note 17)

The program according to Supplementary note 16 above, further comprising processing of storing the characteristic feature value, and processing of deleting the stored characteristic feature value subject to a condition.

(Supplementary Note 18)

The program according to Supplementary note 16 or Supplementary note 17 above, further comprising processing of displaying, on a display device, a movement history of the registered moving object according to the correspondence relationship of the registered moving object and the correspondence relationship of the corrected moving object.

(Supplementary Note 19)

The program according to any one of Supplementary notes 15 to 18 above, wherein the correspondence relationship of a moving object can be corrected by displaying, on a display device, the moving object to be corrected in a time series.

(Supplementary Note 20)

The program according to any one of Supplementary notes 15 to 18 above, wherein the correspondence relationship of a moving object can be corrected by displaying, on a display device, the movement history of the moving object to be corrected.

(Supplementary Note 21)

The program according to any one of Supplementary notes 15 to 20 above, further comprising processing of informing that, when a correspondence relationship is corrected, an inconsistency will occur in the corrected correspondence relationship.

This application relates to and claims priority from Japanese Patent Application No. 2012-205909, filed on Sep. 19, 2012, the entire disclosure of which is incorporated herein by reference.

I claim:

1. An image processing system, comprising:
   input device implemented at least in hardware and configured to receive an input of pictures captured by a plurality of video cameras;
   first registration device implemented at least in hardware and configured to enable registering one or more moving objects appearing in the pictures input from the input device;
   first display control device implemented at least in hardware and configured to display, on a display device, the pictures input by the input device;
   second registration device implemented at least in hardware and configured to enable registering that the moving object appearing in the displayed pictures and the moving object registered by the first registration device are the same moving object;
   correction device implemented at least in hardware and configured to enable correcting a correspondence relationship of a moving object by associating one moving object, which is in a correspondence relationship registered as the same moving object by the second registration device, with a moving object that is different from the other moving object, which is in the correspondence relationship registered as the same moving object by the second registration device; and
   second display control device implemented at least in hardware and configured to display, on a display device, a movement history of the moving object registered by the first registration device according to the correspondence relationship of the moving object registered by the second registration device and the correspondence relationship of the moving object corrected by the correction device.

2. The image processing system according to claim 1, further comprising:
   computing device implemented at least in hardware and configured to calculate a characteristic feature value of the moving object appearing in the pictures input by the input device,
   wherein the second registration device is capable of registering that the moving object appearing in the displayed pictures and the moving object registered by the first registration device are the same moving object according to the characteristic feature value calculated by the computing device.

3. The image processing system according to claim 2, further comprising:
   storage device implemented at least in hardware and configured to store the characteristic feature value; and
   deletion device implemented at least in hardware and configured to delete the characteristic feature value stored in the storage device, subject to a condition.

4. The image processing system according to claim 1, wherein the correction device can correct the correspondence relationship of a moving object by displaying, on a display device, the moving object to be corrected in a time series.

5. The image processing system according to claim 1, wherein the correction device can correct the correspondence relationship of the moving object by displaying, on a display device, a movement history of the moving object to be corrected.

6. The image processing system according to claim 1, further comprising:
   informing device implemented at least in hardware and configured to notify that, when a correspondence relationship is corrected by the correction device, an inconsistency will occur in the corrected correspondence relationship.

7. An image processing method to be performed by an image processing system,
   the method comprising the steps of:
   receiving, by the image processing system, an input of pictures captured by a plurality of video cameras;
   enabling, by the image processing system, registration of one or more moving objects appearing in the input picture;
   displaying, by the image processing system, the input pictures on a display device;
   enabling, by the image processing system, registration to the effect that the moving object appearing in the displayed pictures and the registered moving object are the same moving object; and
   enabling, by the image processing system, correction of a correspondence relationship of a moving object by associating one moving object, which is in a correspondence relationship registered as the same moving object, with a moving object that is different from the other moving object, which is in the correspondence relationship registered as the same moving object; and
   displaying, by the image processing system, on the display device, a registered movement history of the moving object according to the registered correspondence relationship of the moving object and the corrected correspondence relationship of the moving object.

8. A non-transitory storage medium storing a program for causing a computer to execute:
   processing of receiving an input of pictures captured by a plurality of video cameras;
   processing of enabling registration of one or more moving objects appearing in the input picture;
   processing of displaying the input pictures on a display device;
   processing of enabling registration to the effect that the moving object appearing in the displayed pictures and the registered moving object are the same moving object;
   processing of enabling correction of a correspondence relationship of a moving object by associating one moving object, which is in a correspondence relationship registered as the same moving object, with a moving object that is different from the other moving object, which in the correspondence relationship registered as the same moving object, and
   processing of displaying, on a display device, a registered movement history of the moving object according to the registered correspondence relationship of the moving object and the corrected correspondence relationship of the moving object.

* * * * *